US010155490B2

United States Patent
Kinoshita et al.

(10) Patent No.: US 10,155,490 B2
(45) Date of Patent: Dec. 18, 2018

(54) VEHICLE POWER SUPPLY BOX DEVICE

(71) Applicant: Yazaki Corporation, Tokyo (JP)

(72) Inventors: Kousuke Kinoshita, Makinohara (JP); Masahiro Takamatsu, Makinohara (JP); Koichi Uezono, Makinohara (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 61 days.

(21) Appl. No.: 15/444,710

(22) Filed: Feb. 28, 2017

(65) Prior Publication Data

US 2017/0166146 A1    Jun. 15, 2017

Related U.S. Application Data

(63) Continuation of application No. PCT/JP2015/077372, filed on Sep. 28, 2015.

(30) Foreign Application Priority Data

Sep. 29, 2014    (JP) ................................. 2014-199131

(51) Int. Cl.
*B60L 1/00* (2006.01)
*B60L 3/00* (2006.01)
(Continued)

(52) U.S. Cl.
CPC .............. *B60R 16/03* (2013.01); *B60K 35/00* (2013.01); *F02N 15/10* (2013.01); *H02J 1/00* (2013.01);
(Continued)

(58) Field of Classification Search
CPC .. B60R 16/03; B60K 35/00; B60K 2350/962; F02N 15/10; H02J 1/00; Y02T 10/92
(Continued)

(56) References Cited

U.S. PATENT DOCUMENTS

| 2006/0085110 | A1 | 4/2006 | Abe | |
| 2006/0259209 | A1* | 11/2006 | Sugimura | .......... G01R 31/3278 701/1 |
| 2009/0066159 | A1 | 3/2009 | Peuser | |

FOREIGN PATENT DOCUMENTS

| CN | 101044665 A | 9/2007 |
| JP | 5-58508 U | 8/1993 |

(Continued)

OTHER PUBLICATIONS

Search Report dated Nov. 17, 2015, issued by the International Searching Authority in counterpart International Patent Application No. PCT/JP2015/077372 (PCT/ISA/210).

(Continued)

*Primary Examiner* — Carlos D Amaya
(74) *Attorney, Agent, or Firm* — Sughrue Mion, PLLC

(57) ABSTRACT

A vehicle power supply box device includes: a first system including a first relay connected downstream of a second line for feeding electric power in association with a state of an ignition switch, to be turned ON/OFF in association with the state; and a second system including a second relay connected downstream of a first line for constantly feeding electric power, to be turned ON/OFF in association with the state of the ignition switch. The device further includes: a recovery switch portion connected between an output of a switch portion of the first relay and an output of the second system; an operation abnormality detecting portion which detects presence/absence of abnormality in the output of the switch portion of the second relay; and a recovery control portion which controls the recovery switch portion to be turned ON/OFF in accordance with the presence/absence of the abnormality.

5 Claims, 9 Drawing Sheets

(51) Int. Cl.
*H02G 3/00* (2006.01)
*B60R 16/03* (2006.01)
*H02J 1/00* (2006.01)
*B60K 35/00* (2006.01)
*F02N 15/10* (2006.01)

(52) U.S. Cl.
CPC ......... *B60K 2350/962* (2013.01); *Y02T 10/92* (2013.01)

(58) Field of Classification Search
USPC .......................................................... 307/9.1
See application file for complete search history.

(56) References Cited

FOREIGN PATENT DOCUMENTS

| JP | 10-184507 A | 7/1998 |
|---|---|---|
| JP | 2003-72490 A | 3/2003 |
| JP | 2009-220601 A | 10/2009 |
| JP | 2011-207384 A | 10/2011 |
| WO | 2004/104834 A1 | 12/2004 |

OTHER PUBLICATIONS

Written Opinion dated Nov. 17, 2015, issued by the International Searching Authority in counterpart International Patent Application No. PCT/JP2015/077372 (PCT/ISA/237).

English translation of the International Preliminary Report on Patentability and Written Opinion, dated Nov. 17, 2015, issued by the International Searching Authority in counterpart International Application No. PCT/JP2015/077372 (PCT/IB/373 & PCT/ISA/237).

Communication dated Sep. 19, 2018, issued by the China National Intellectual Property Administration in counterpart Chinese Application No. 201580052935.7.

* cited by examiner

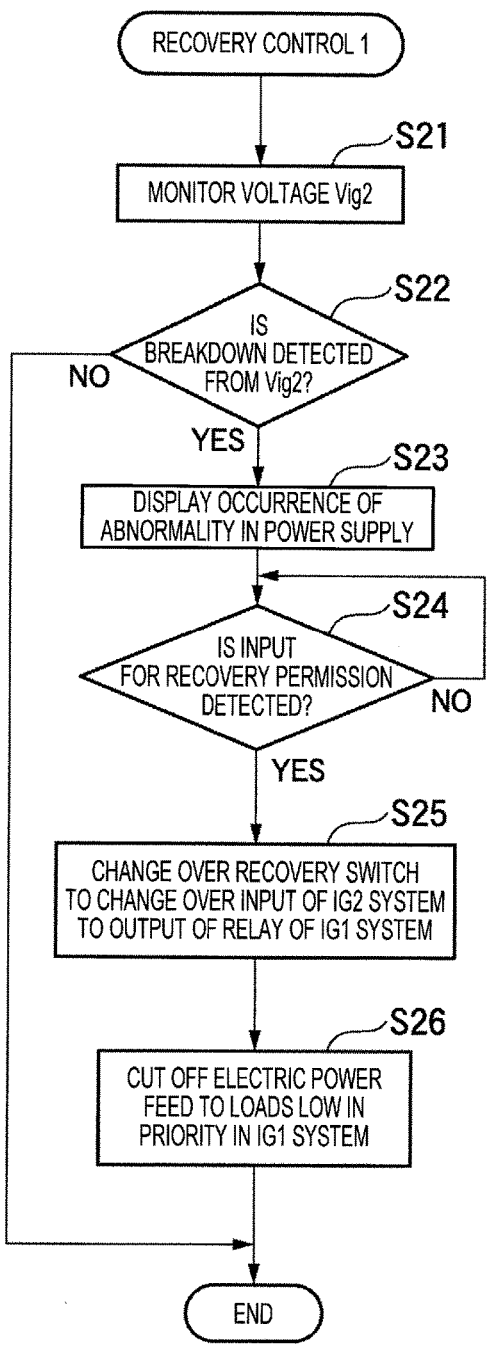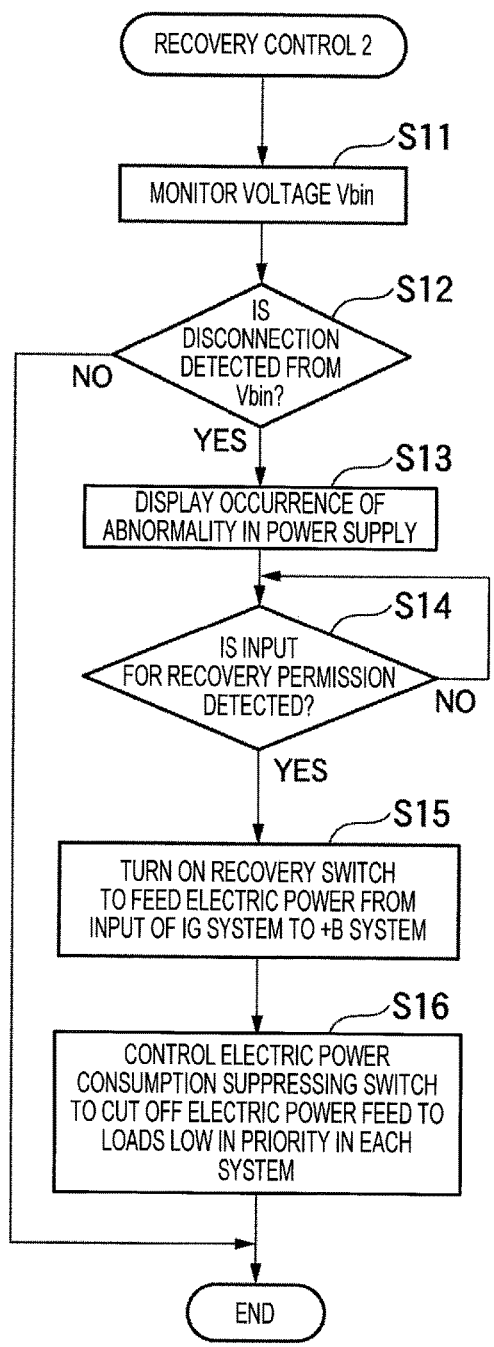

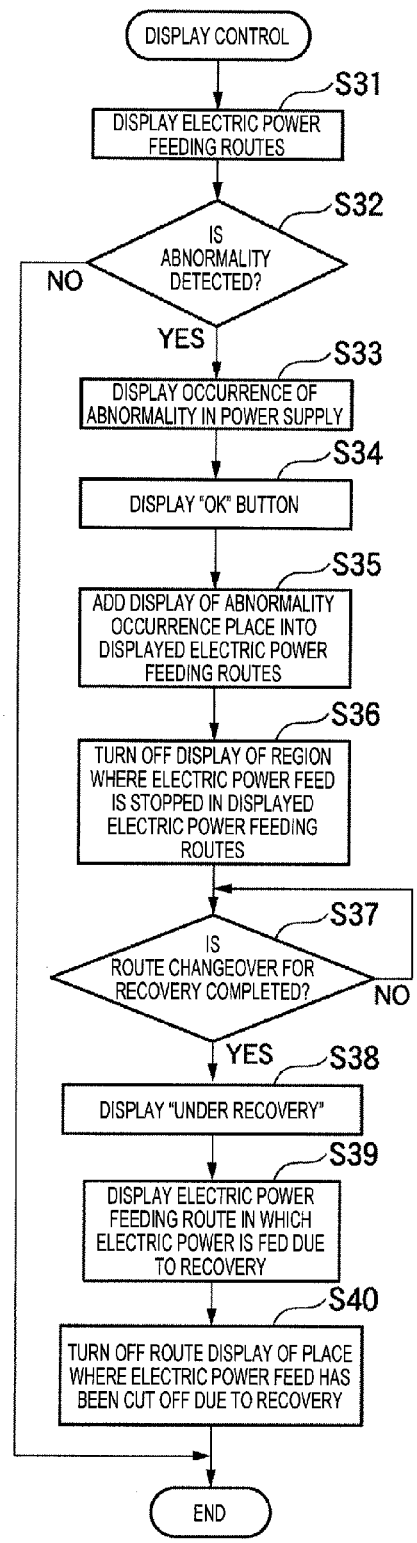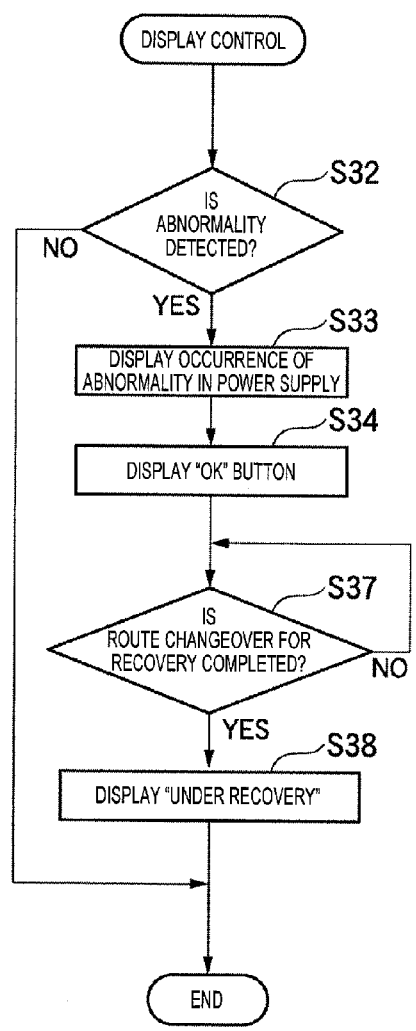

VEHICLE POWER SUPPLY BOX DEVICE

CROSS REFERENCE TO RELATED APPLICATION(S)

This application is a continuation of PCT application No. PCT/JP2015/077372, which was filed on Sep. 28, 2015 based on Japanese Patent Application No. 2014-199130 filed on Sep. 29, 2014, the contents of which are incorporated herein by reference.

BACKGROUND OF THE INVENTION

1. Field of the Invention

The present invention relates to a vehicle power supply box device which is disposed between an output of a main power supply on a vehicle and power supply lines for a plurality of electric parts mounted on the vehicle.

2. Description of the Related Art

JP-A-2003-72490, JP-A-2009-220601, and WO 2004/104834 A1 belong to background-art techniques of the invention. In a vehicle, power supply electric power (e.g. +12 [V] DC power) has to be fed from an output of a main power supply on the vehicle to respective loads mounted on the vehicle, via a predetermined wire harness. The main power supply is an on-vehicle battery or an alternator, and the loads are various electric devices (also including ECUs). In addition, the output of the main power supply has to be distributed to a plurality of systems, ON/OFF of electric power feed has to be controlled in accordance with each of the systems, or respective portions of a circuit has to be protected against abnormality such as an overcurrent.

Accordingly, it is general to dispose a junction box or dispose a device called a fuse box or a power supply box between the output of the battery and the large number of loads, as shown in FIG. 1 of JP-A-2003-72490.

JP-A-2003-72490 discloses a vehicle load driving system which can perform drive control on large-power electric loads consuming large electric power even when a communication state of a multiple communication line becomes abnormal for performing drive control of high electric loads which have high importance using the multiple communication line.

JP-A-2009-220601 discloses a vehicle power supply system in which electric power feed to an important load is changed over to be performed from a battery when an alternator is abnormal.

WO 2004/104834 A1 discloses a recovery control method of a vehicle control system provided for performing suitable recovery processing in accordance with a situation of abnormality in power supply.

SUMMARY OF THE INVENTION

Very important electric devices directly relevant to driving such as running, turning or stopping, and electric devices not directly relevant to the driving are present in a vehicle. No serious problem occurs even when the latter electric devices stop operating. However, there is a possibility that the vehicle may cause an accident when the former electric devices stop operating during driving.

For example, assume that an electric device belonging to a braking system stops when the vehicle is travelling. In this case, deceleration or stop of the vehicle is significantly hindered. In addition, for example, assume that operation of an electric power steering device or an electric device such as a direction indicator stops when the vehicle is travelling on a curved road or when the vehicle is turning at an intersection. In this case, it is difficult for the vehicle to make a turn safely. In addition, for example, assume that operation of an electric device belonging to an engine system or a transmission system stops when the vehicle is travelling on a road having a large traffic volume, a highway etc. In this case, it is difficult to move the vehicle to a place where the vehicle can be stopped safely.

However, when electric power feed from the vehicle side to a highly important electric device of various electric devices mounted on the vehicle stops for some reason, operation of the highly important electric device stops immediately. Therefore, it can be also considered that the vehicle is likely to fall into a dangerous situation.

Each actual vehicle is designed and manufactured with a concept in which electric power feed from the vehicle side to various electric devices should be prevented from stopping if not necessary. Accordingly, an on-vehicle power supply feeding system has sufficiently high reliability. However, it is desirable that a possibility that, for example, disconnection of an electric wire of a wire harness, contact failure of a connector, etc. may occur for some reason is also taken into consideration. That is, it is desired that an operation of feeding electric power to the highly important electric device is maintained even when abnormality has occurred in electric power feed from the power supply for some unexpected reason.

On the other hand, electric power feeding systems independent of each other are generally present in the on-vehicle power supply feeding system. Specifically, the on-vehicle power supply feeding system has an IG system, an ACC system, a +B system, etc. which will be shown as follows. These electric power feeding systems are optimized in accordance with applications or load-side specifications (electric power consumption etc.) respectively.

IG system: Electric power is fed when a vehicle key switch is in an ON or start position and an ignition (IG) switch is ON.

ACC system: Electric power is fed when the vehicle key switch is in an ACC or ON position and an accelerator (ACC) switch is ON.

+B system: Electric power which is outputted by the battery or the alternator of the vehicle is constantly fed regardless of the position of the vehicle key switch.

The aforementioned highly important electric device is generally connected to the aforementioned "+B system". However, when abnormality such as disconnection occurs on an upstream side of the "+B system", electric power feed to the highly important electric device also stops.

In addition, in some cases, the highly important electric device may also have to be fed with power supply electric power via a switch of some relay due to the necessity of system specifications. However, when the relay breaks down, the vehicle is likely to fall into a situation that electric power cannot be fed to the highly important electric device.

The invention has been accomplished in consideration of the aforementioned circumstances. An object of the invention is to provide a vehicle power supply box device which can secure a route for feeding electric power to at least a highly important electric device even when unexpected abnormality in power supply has occurred.

In order to achieve the above-described object, a vehicle power supply box device according to aspects of the present invention includes the following items (1) to (5).

(1) A vehicle power supply box device which is connected between: a first input side power supply line for constantly feeding power supply electric power from a main power supply on a vehicle and a second input side power supply line for feeding power supply electric power from the main power supply in association with a state of an ignition switch of the vehicle; and a plurality of electric parts mounted on the vehicle, the vehicle power supply box device including:

a first ignition electric power control system which includes a first ignition relay connected downstream of the second input side power supply line to be turned ON/OFF in association with the state of the ignition switch, and which feeds power supply electric power to first group electric parts from an output of a switch portion of the first ignition relay;

a second ignition electric power control system which includes a second ignition relay connected downstream of the first input side power supply line to be turned ON/OFF in association with the state of the ignition switch, and which feeds power supply electric power to second group electric parts from an output of a switch portion of the second ignition relay;

a recovery switch portion which is connected between the output of the switch portion of the first ignition relay and an output of the second ignition electric power control system;

an operation abnormality detecting portion which detects presence/absence of abnormality in the output of the switch portion of the second ignition relay; and a recovery control portion which controls the recovery switch portion to be turned ON/OFF in accordance with the presence/absence of the abnormality detected by the operation abnormality detecting portion.

(2) The vehicle power supply box device according to the item (1), wherein the recovery switch portion includes:

a first selection switch portion which selects one of the output of the switch portion of the first ignition relay and the output of the switch portion of the second ignition relay as an electric power feeding system connected to an input of the second group electric parts; and a second selection switch portion which cuts off electric power feed to the first group electric parts in response to selection of the output of the switch portion of the first ignition relay by the first selection switch portion.

(3) The vehicle power supply box device according to the item (1) or (2), wherein the operation abnormality detecting portion monitors an input voltage to detect presence/absence of abnormality corresponding to operation failure in the second ignition relay.

(4) The vehicle power supply box device according to any one of the items (1) to (3), further including:

an operating portion which accepts an input operation from a user; and a display portion which displays desired information as visual information, wherein the recovery control portion displays visual information indicating occurrence of abnormality on the display portion in response to detection of the abnormality by the operation abnormality detecting portion, and changes over the recovery switch portion to ON in response to detection of an instruction issued from the user to indicate permission of a recovery operation by the operating portion.

(5) The vehicle power supply box device according to any one of the items (1) to (3), further including:

a display portion which displays desired information as visual information, wherein the recovery control portion displays, on the display portion, at least one of visual information indicating occurrence of abnormality and visual information indicating that a predetermined recovery operation is in execution due to the occurrence of the abnormality.

According to the vehicle power supply box device having the configuration according to the item (1), the connection of the recovery switch portion is changed over to ON when electric power is not fed from the output of the second ignition electric power control system due to occurrence of abnormality in which, for example, the connection of the switch portion of the second ignition relay stays OFF unmovably. In this manner, electric power can be fed to the output of the second ignition electric power control system via the first ignition electric power control system and the recovery switch portion. Accordingly, it is possible to secure a route for feeding electric power to the second group electric parts high in importance even under the abnormality.

According to the vehicle power supply box device having the configuration according to the item (2), electric power feed to the first group electric parts relatively low in importance is cut off when a recovery operation is performed due to occurrence of abnormality. Accordingly, it is possible to feed sufficient electric power to the second group electric parts high in importance even when electric power allowed by the second input side power supply line and the first ignition electric power control system is relatively small due to system specifications.

According to the vehicle power supply box device having the configuration according to the item (3), it is possible to detect abnormality surely when electric power cannot be fed to a load side due to operation failure of the second ignition relay.

According to the vehicle power supply box device having the configuration according to the item (4), it is possible to inform a user (driver) of occurrence of abnormality about the electric power feeding system and it is possible to reflect the user's will to change over the route for feeding electric power.

According to the vehicle power supply box device having the configuration according to the item (5), it is possible to surely inform the driver of the situation of the vehicle when abnormality in power supply has occurred.

According to the vehicle power supply box device according to aspects of the invention, it is possible to secure a route for feeding electric power to at least a highly important electric device even when unexpected abnormality in power supply has occurred.

The aspects of the invention have been described above briefly. Further, when the following embodiments are read through with reference to the accompanying drawings, details can be made further clear.

BRIEF DESCRIPTION OF THE DRAWINGS

FIG. 2A and FIG. 2B are flow charts respectively showing contents of two kinds of recovery control in the vehicle power supply box device shown in FIG. 1.

FIG. 3A and FIG. 3B are flow charts respectively showing contents of two kinds of display control in the vehicle power supply box device shown in FIG. 1.

DETAILED DESCRIPTION OF THE EXEMPLARY EMBODIMENTS

A specific embodiment concerned with a vehicle power supply box device will be described below with reference to the respective drawings.

<Configuration of Device>

<Overview>

Figure 1:
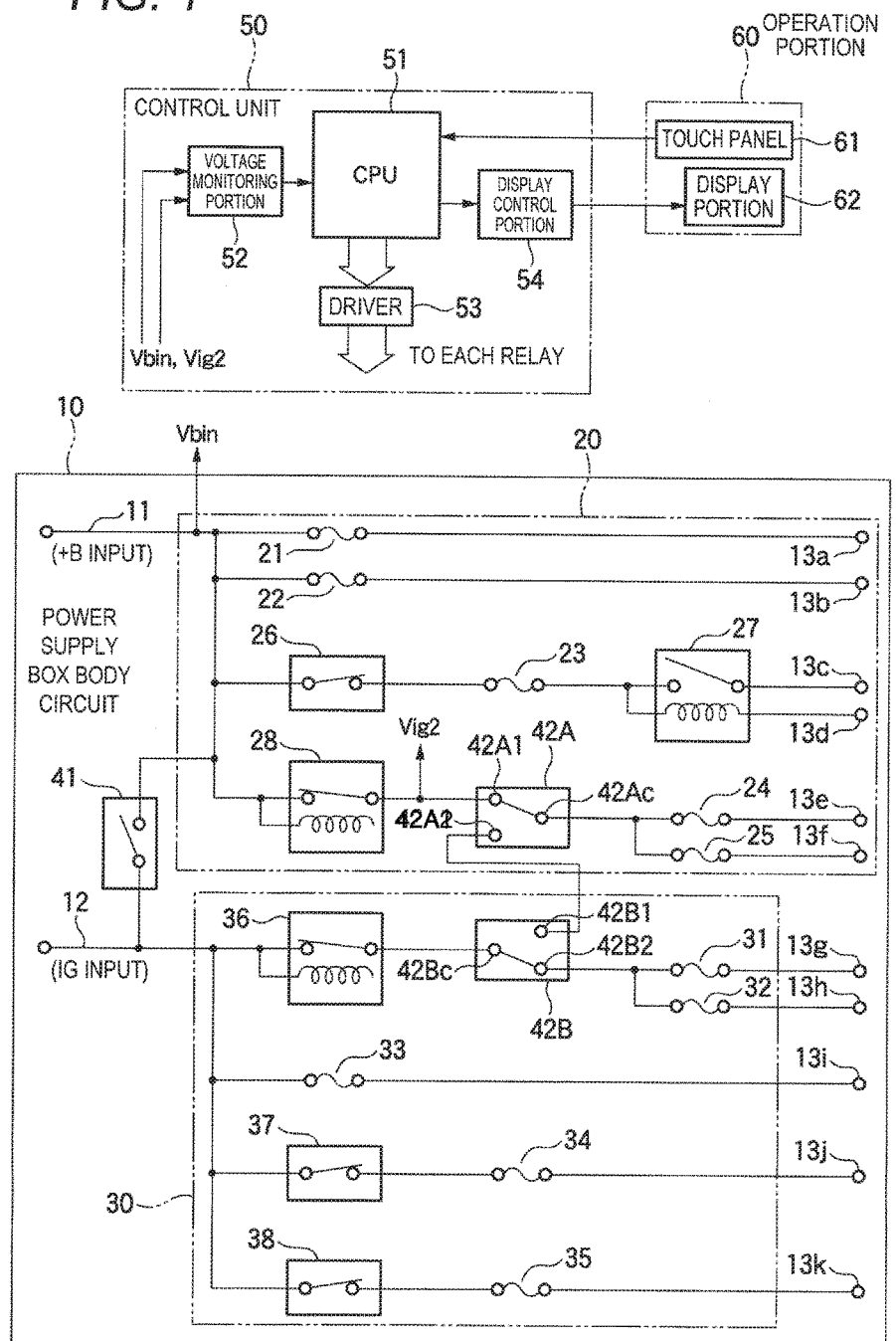
FIG. 1 is a block diagram showing a configuration example of a vehicle power supply box device according to an embodiment of the invention.

A configuration example of a vehicle power supply box device according to the embodiment is shown in FIG. 1. The vehicle power supply box device shown in FIG. 1 is disposed between an output of a main power supply of a vehicle and loads mounted on the vehicle. The main power supply is an alternator (power generator) or an on-vehicle battery, and the loads are various electric devices and various electronic control units (ECUs) which are not shown. The vehicle power supply box device is used for controlling electric power feed to the respective loads.

As fundamental functions, the vehicle power supply box device has a function of breaking an overcurrent for each of load systems using fuses, and a function of controlling ON/OFF of electric power feed to the loads using relays.

On the other hand, an on-vehicle power supply feeding system includes a plurality of electric power feeding systems which are provided to satisfy various requirements on the vehicle side and the load side. Specifically, the on-vehicle power supply feeding system has an IG system, an ACC system, a +B system etc. which will be shown as follows. These electric power feeding systems are optimized in accordance with applications or load-side specifications (electric power consumption etc.) respectively.

IG system: Electric power is fed when a vehicle key switch is in an ON or start position and an ignition (IG) switch is ON. In addition, in some cases, the IG system may be divided into two systems, i.e. an "IG1 system" and an "IG2 system".

ACC system: Electric power is fed when the vehicle key switch is in an ACC or ON position and an accessory (ACC) switch is ON.

+B system: Electric power outputted by the battery or the alternator of the vehicle is constantly fed regardless of the position of the vehicle key switch.

For example, electric devices (a power window, a door lock, etc.) disposed in each door of the vehicle have to be constantly operated even in a state in which the vehicle is stopped. Accordingly, the electric devices are usually fed with electric power from the "+B system". In addition, an electric device consuming relatively large power, such as an air conditioner or any of various heaters of the vehicle, is fed with electric power from the "IG system" so that the battery can be prevented from being consumed in a state in which the vehicle is stopped (in a state in which the vehicle is not generating power). In addition, an electric device consuming relatively small electric power, such as a car audio device, is fed with electric power from the "ACC" system so that the battery can be used in accordance with a user's request even in the state in which the vehicle is stopped.

In the vehicle power supply box device shown in FIG. 1, electric power is fed from the output of the alternator and the on-vehicle battery, which are the main power supply of the vehicle, to a +B power supply side input line 11 and an IG power supply side input line 12 respectively. The +B power supply side input line 11 is an electric wire prepared for feeding electric power of the aforementioned "+B system". The IG power supply side input line 12 is an electric wire prepared for feeding electric power of the aforementioned "IG system". The +B power supply side input line 11 and the IG power supply side input line 12 are connected between the output of the main power supply and an input of the vehicle power supply box device in FIG. 1 in independent routes of each other.

A function for turning ON/OFF electric power feed to the "IG system" loads in association with the state of the ignition switch is disposed inside the vehicle power supply box device in FIG. 1. Accordingly, electric power from the output of the main power supply is constantly fed to the IG power supply side input line 12 regardless of the state of the ignition switch.

On the other hand, a wire harness including the +B power supply side input line 11, the IG power supply side input line 12, etc. is designed and manufactured so that sufficiently high reliability can be obtained. However, it is also important that a possibility that unexpected breakdown may occur for some reason is also taken into consideration.

When, for example, one of the +B power supply side input line 11 and the IG power supply side input line 12 is disconnected or contact failure occurs in a portion of a connector etc., power supply failure occurs in the vehicle power supply box device so that electric power cannot be fed to electric devices under the failed one of the +B power supply side input line 11 and the IG power supply side input line 12. In addition, when breakdown of a relay has occurred inside the vehicle power supply box device, power supply failure occurs so that electric power cannot be fed to each electric device connected downstream of the relay.

In a case in which the aforementioned power supply failure has occurred, when electric power feed to electric devices directly relevant to driving of the vehicle, i.e. electric devices actuating one of a traveling system, a steering system and a braking system of the vehicle stops in this case, the driving is hindered so that it is difficult to secure safety. Therefore, the vehicle power supply box device shown in FIG. 1 is equipped with a special function for securing a route for feeding electric power to electric devices which are high in importance and directly relevant to the driving of the vehicle, even when unexpected power supply failure has occurred. Details will be described later.

<Details of Configuration>

The vehicle power supply box device shown in FIG. 1 is provided with a power supply box body circuit 10, a control unit 50, and an operating portion 60.

The power supply box body circuit 10 feeds electric power fed from the main power supply of the vehicle to the +B power supply side input line 11 and the IG power supply side input line 12, to respective loads (electric devices and ECUs) on the load side. The control unit 50 executes control of a part of relays inside the power supply box body circuit 10. The operating portion 60 includes a touch panel 61 and a display portion 62 to provide a user interface for operating the power supply.

<Configuration of Power Supply Box Body Circuit 10>

The power supply box body circuit 10 shown in FIG. 1 is provided with a +B power supply side circuit 20 connected to the +B power supply side input line 11, an IG power supply side circuit 30 connected to the IG power supply side input line 12, and a recovery first relay 41. Incidentally, although signs designating a part of relay coils in FIG. 1 are omitted, driving coils are provided in all the relays. It is a matter of course that each of the relays may be replaced by a coil-free semiconductor relay.

<Configuration of +B Power Supply Side Circuit 20>

The +B power supply side circuit 20 is provided with five fuses 21 to 25, a relay 26, a body system relay 27, an IG2 system relay 28, a recovery second relay 42A, and output terminals 13a to 13f. The +B power supply side circuit 20 is roughly divided to feed electric power to respective loads in four routes.

As to the first route of the +B power supply side circuit 20, electric power is fed from the +B power supply side input line 11 to the output terminal 13a via the fuse 21. In addition, as to the second route of the +B power supply side circuit 20, electric power is fed from the +B power supply side input line 11 to the output terminal 13b via the fuse 22. Moreover, as to the third route of the +B power supply side circuit 20, electric power is fed from the +B power supply side input line 11 to the output terminal 13c via a switch of the relay 26, the fuse 23 and a switch of the body system relay 27. Moreover, as to the fourth route of the +B power supply side circuit 20, electric power is fed from the +B power supply side input line 11 to the output terminal 13e or 13f via a switch of the IG2 system relay 28, a switch of the recovery second relay 42A and the fuse 24 or 25.

When a switch of the recovery first relay 41 has been changed over to ON by control of the control unit 50, electric power may be fed from the IG power supply side input line 12 instead of being fed from the +B power supply side input line 11. In addition, the switch of the recovery second relay 42A may be changed over so that the fourth route of the +B power supply side circuit 20 can be changed over.

The output terminal 13a is used, for example, for feeding power supply electric power to an electric device of a flasher blinking a lamp of the vehicle. The output terminal 13b is used, for example, for feeding power supply electric power for controlling the not-shown ignition switch.

The output terminal 13c is used, for example, for feeding power supply electric power to a plurality of electric devices mounted in all the doors of the vehicle. In addition, a control output of a not-shown electronic control unit (ECU) controlling the body system including the electric devices of the doors is connected to the output terminal 13d. The switch of the body system relay 27 is changed over between ON and OFF by control of the electronic control unit.

The output terminal 13e is used, for example, for feeding power supply electric power to a not-shown electronic control unit (ECU) controlling various electric devices classified into the IG2 system. The output terminal 13f is used, for example, for feeding power supply electric power to an air bag of the vehicle.

The IG2 system relay 28 is controlled in association with the not-shown ignition switch as follows. That is, when the ignition switch is ON, the switch of the IG2 system relay 28 is also ON. When the ignition switch is OFF, the switch of the IG2 system relay 28 is also OFF.

The switches of the recovery first relay 41, the relay 26, and the recovery second relay 42A are in states shown in FIG. 1 in an initial state and a normal state. The states of these switches are changed over by control of the control unit 50 at an abnormality occurrence time etc. Incidentally, as to the switch of the recovery second relay 42A, a common terminal 42Ac can be selectively connected to one of two terminals 42A1 and 42A2.

<Configuration of IG Power Supply Side Circuit 30>

The IG power supply side circuit 30 is provided with five fuses 31 to 35, an IG1 system relay 36, relays 37 and 38, a recovery second relay 42B, and output terminals 13g to 13k. The IG power supply side circuit 30 is roughly divided to feed electric power to respective loads in four routes.

As to the first route of the IG power supply side circuit 30, power supply electric power is fed from the IG power supply side input line 12 to the output terminal 13g or 13h via a switch of the IG1 system relay 36, a switch of the recovery second relay 42B, and the fuse 31 or the fuse 32. However, when the control unit 50 controls the recovery second relay 42B, the switch of the recovery second relay 42B may be changed over so that electric power can be fed to another route.

The IG1 system relay 36 is controlled in association with the not-shown ignition switch as follows. That is, when the ignition switch is ON, the switch of the IG1 system relay 36 is also ON. When the ignition switch is OFF, the switch of the IG1 system relay 36 is also OFF.

As to the second route of the IG power supply side circuit 30, electric power is fed from the IG power supply side input line 12 to the output terminal 13i via the fuse 33. As to the third route of the IG power supply side circuit 30, electric power is fed from the IG power supply side input line 12 to the output terminal 13j via a switch of the relay 37 and the fuse 34. As to the fourth route of the IG power supply side circuit 30, electric power is fed from the IG power supply side input line 12 to the output terminal 13k via a switch of the relay 38 and the fuse 35.

The switches of the relay 37 and the recovery second relay 42B can be changed over independently of each other by control of the control unit 50. The switch of the relay 38 can be changed over by control of a not-shown electronic control unit (ECU). Incidentally, as to the switch of the recovery second relay 42B, a common terminal 42Bc can be selectively connected to one of two terminals 42B1 and 42B2.

The output terminal 13g is used, for example, for feeding power supply electric power to various electric devices classified into the IG1 system, i.e. first group electric devices which have to association with the ignition switch. Incidentally, here, the first group electric devices mean electric devices relatively low in importance and not directly relevant to the driving (running, turning, stopping) of the vehicle. In addition, the output terminal 13h is used for feeding power supply electric power to an electronic control unit (not shown) controlling the various electric devices classified into the IG1 system or other electric devices relatively low in importance and not directly relevant to the driving (running, turning, stopping) of the vehicle.

The output terminal 13i is used, for example, for feeding power supply electric power to an electric device (AM1) controlling an engine system. In addition, the output terminal 13j is used for feeding power supply electric power to electric devices (DOME) inside a cabin, such as an audio device, a room lamp, a clock etc. Moreover, the output terminal 13k is used for feeding power supply electric power to an electric device such as a tail lamp (TAIL LP) of the vehicle.

ON/OFF of the relay 37 for controlling electric power feed to the output terminal 13j is controlled in accordance with a signal outputted by the control unit 50. In addition, ON/OFF of the relay 38 for controlling electric power feed to the output terminal 13k is controlled in accordance with a signal outputted by the not-shown electronic control unit (ECU).

<Configuration of Control Unit 50>

The control unit 50 shown in FIG. 1 is provided with a microcomputer (CPU) 51, a voltage monitoring portion 52, a driver 53, and a display control portion 54. Incidentally, a logic circuit which can carry out equivalent control may be used in place of the microcomputer 51. However, when relatively complicated control is carried out, use of the microcomputer can achieve the complicated control at low cost.

The microcomputer 51 executes a program which has been incorporated in advance, to thereby control ON/OFF of the respective relays inside the power supply box body circuit 10 to achieve a characteristic recovery control function which will be described later.

In the vehicle power supply box device shown in FIG. 1, the voltage monitoring portion 52 monitors a voltage Vbin appearing in the +B power supply side input line 11, and a voltage Vig2 appearing in an output of the IG2 system relay 28 respectively. Practically, the microcomputer 51 grasps digital values of the voltages Vbin and Vig2 respectively through the voltage monitoring portion 52, and identifies presence/absence of abnormality in power supply based on these voltage values.

The driver 53 amplifies a plurality of control signals outputted by the microcomputer 51 individually, and applies the amplified control signals to respective driving coils of the relay 26, the recovery first relay 41, the recovery second relays 42A and 42B and the relay 37 which are disposed inside the power supply box body circuit 10, to thereby carry out ON/OFF driving of the respective relays.

The display control portion 54 carries out display control for displaying information outputted by the microcomputer 51 as visual information on a display screen 63 of the display portion 62. The display portion 62 of the operating portion 60 has the planar display screen 63 constituted by a liquid crystal display device. In addition, the display screen 63 is constituted by a large number of pixels each of which can control presence/absence of display, a display color, gradation, etc. separately. Accordingly, the display screen 63 can display visual information such as an image, a figure, or characters in accordance with an instruction of the microcomputer 51. In addition, the transparent touch panel 61 is superimposed and disposed on the display screen 63 of the display portion 62. When a user touches the touch panel 61 with his/her finger, an input operation on an operation button displayed on the display screen 63 can be performed. Incidentally, change may be made so that an input operation can be performed by use of a switch (not shown) provided in another place than the touch panel 61. In this case, the touch panel 61 of the operating portion 60 may be omitted.

<Operation of Device>

Figure 4A:
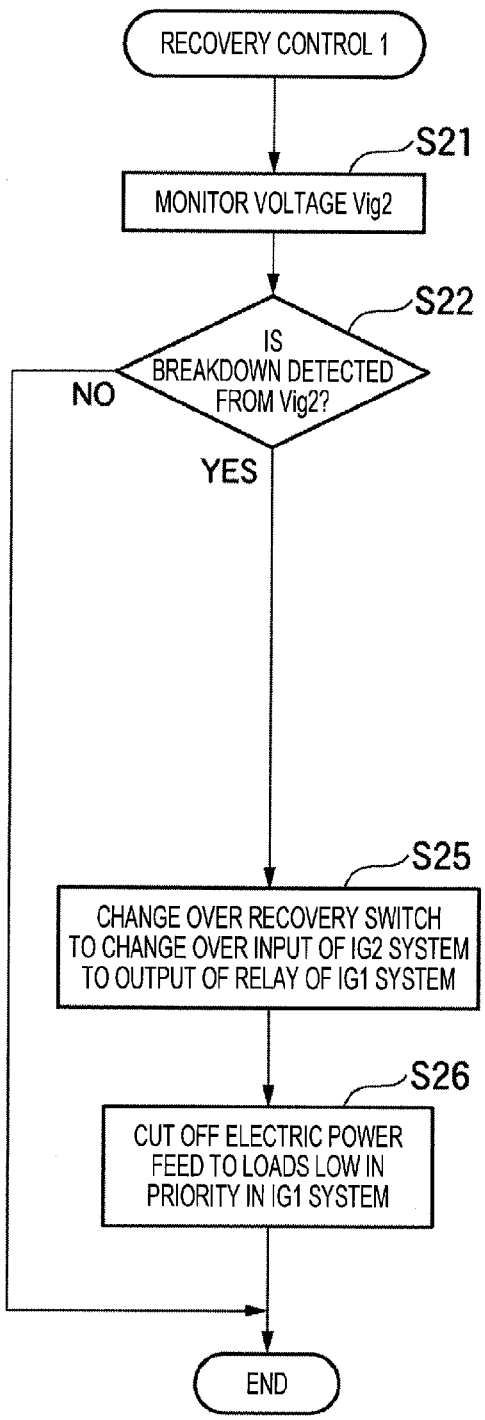
FIG. 4A and FIG. 4B are flow charts respectively showing modifications of the contents of FIG. 2A and FIG. 2B.
Figure 4B:
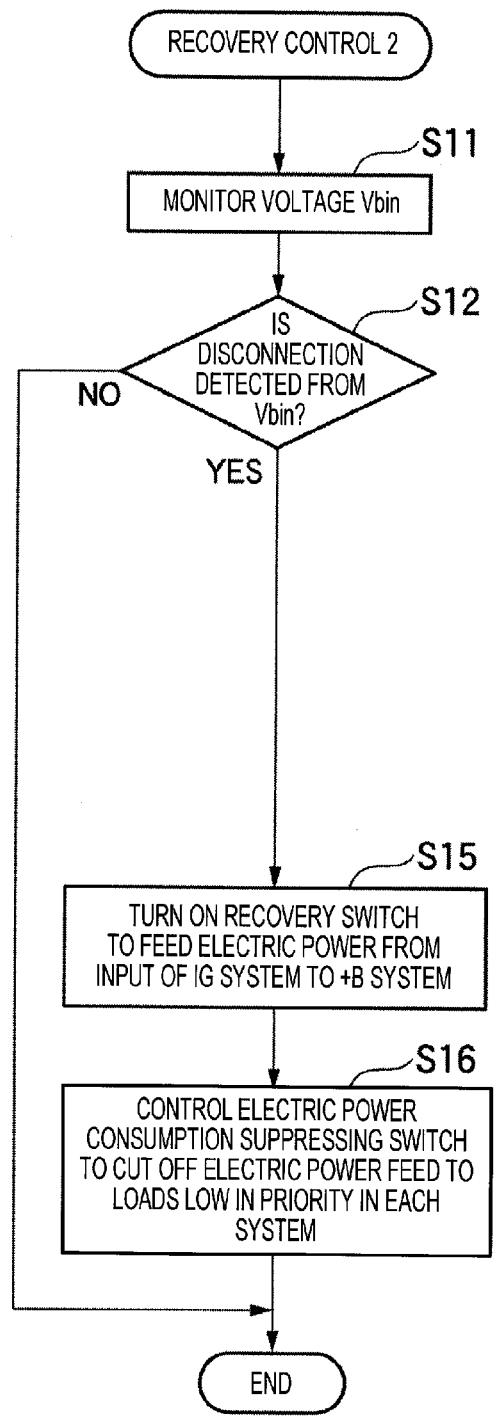

Contents of two kinds of recovery control in the vehicle power supply box device shown in FIG. 1 are shown in FIG. 2A and FIG. 2B respectively. That is, when the microcomputer 51 of the control unit 50 shown in FIG. 1 carries out at least "recovery control 1" of the "recovery control 1" shown in FIG. 2A and "recovery control 2" shown in FIG. 2B, the characteristic recovery operation is achieved. Incidentally, the "recovery control 1" of FIG. 2A and the "recovery control 2" of FIG. 2B are repeatedly executed, for example, in a fixed period. In addition, modifications of FIG. 2A and FIG. 2B are shown in FIG. 4A and FIG. 4B.

<Recovery Control 1>

In a step S21 of FIG. 2A, the microcomputer 51 measures a voltage Vig2 in the output of the IG2 system relay 28 through the voltage monitoring portion 52 to acquire a latest value of the voltage Vig2.

In a step S22, the microcomputer 51 compares the value of the voltage Vig2 acquired in S21 with a predetermined threshold, to identify presence/absence of abnormality such as breakdown of the IG2 system relay 28. The voltage Vig2 becomes 0 [V] when the IG2 system relay 28 has broken down to leave a contact point of the switch of the IG2 system relay 28 open unmovably. Accordingly, when an intermediate value between the normal voltage of the voltage Vig2 and 0 [V] is set as the threshold, the microcomputer 51 can identify presence/absence of the breakdown. The microcomputer 51 terminates the process of FIG. 2A at the normal time. The microcomputer 51 goes to S23 when the breakdown is detected.

In the step S23, the microcomputer 51 displays visual information on the display screen 63 of the display portion 62. Due to the visual information indicating occurrence of the abnormality in power supply, the user can be informed of the abnormality. Incidentally, specific contents of display control will be described later.

In a step S24, the microcomputer 51 monitors an input from the user on the touch panel 61 to thereby identify presence/absence of an input for recovery permission. When the operation input for recovery permission is detected, the microcomputer 51 goes to a next step S25. Incidentally, it is also supposed that the microcomputer 51 performs processing to go to S25 automatically, for example, after a lapse of a predetermined time in spite of absence of the operation input for recovery permission. In addition, the microcomputer 51 may omit the steps S23 and S24 but perform processing as in the modification shown in FIG. 4A, or may omit only the step S24 but keep the display function of S23.

Figure 8:
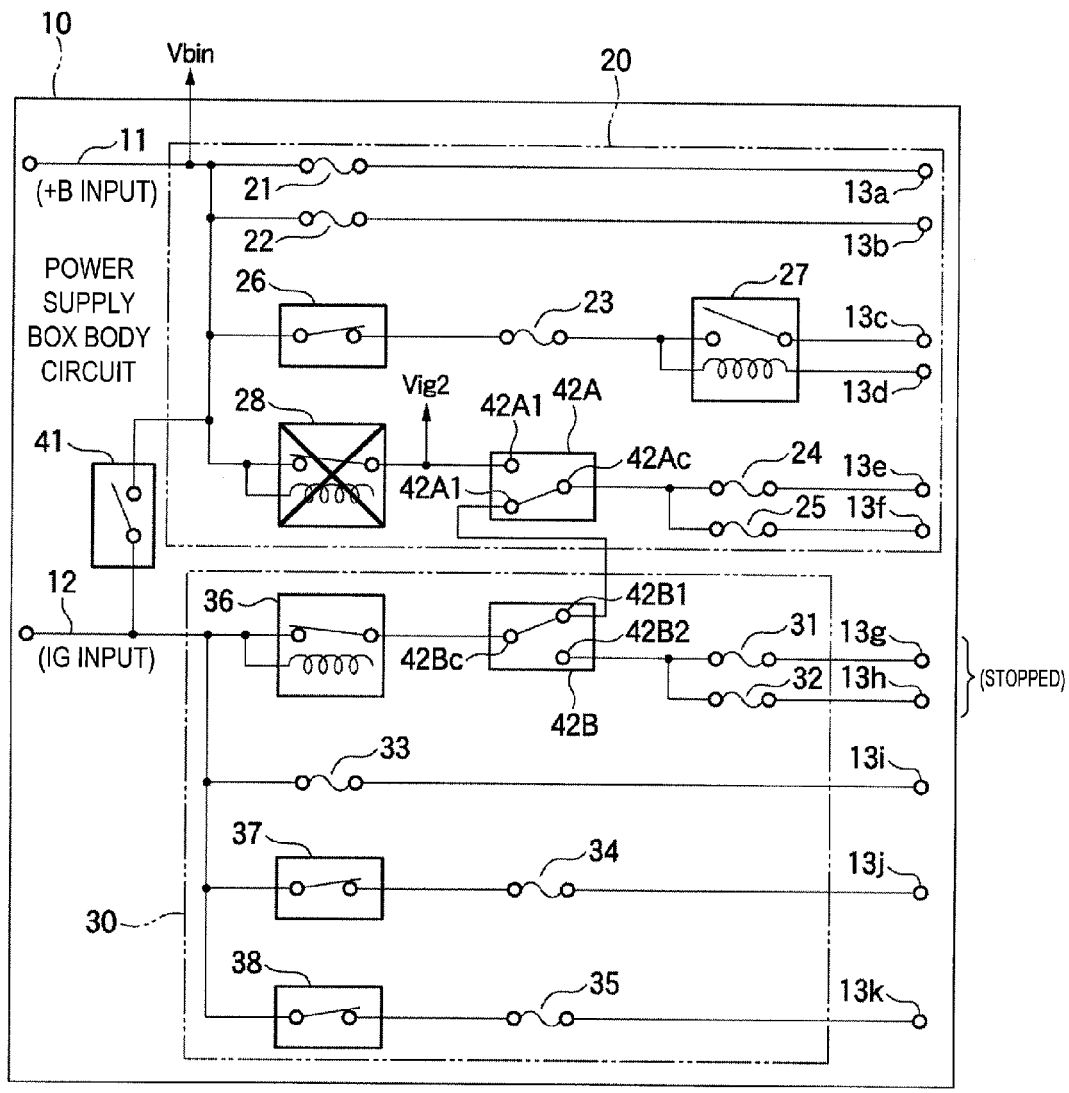
FIG. 8 is an electric circuit diagram showing the state of the abnormality occurrence time in a power supply box body circuit shown in FIG. 1.

In the step S25, the microcomputer 51 controls the recovery second relays 42A and 42B, to change over the input of the IG2 system to the output of the relay of the IG1 system. That is, the switch of the recovery second relay 42A is changed over to connect the common terminal 42Ac to the terminal 42A2. In addition, the switch of the recovery second relay 42B is changed over to connect the common terminal 42Bc to the terminal 42B1. Thus, the output of the IG1 system relay 36 is connected to the input of the fuses 24 and 25 belonging to the IG2 system, via the respective switches of the recovery second relays 42B and 42A. The respective switches are changed over to a state shown in FIG. 8 by the control of S25.

That is, when electric power from the +B power supply side cannot be fed to the input side of the recovery second relay 42A due to the breakdown of the IG2 system relay 28, electric power is fed instead from the output (IG1 system) of the IG1 system relay 36 to the input of the fuses 24 and 25 belonging to the IG2 system via the recovery second relays 42B and 42A, as a recovery operation.

In a step S26, the microcomputer 51 cuts off electric power feed to loads low in priority among the loads connected to the IG1 system so that total electric power consumption can be suppressed to thereby prevent shortage of electric power from occurring. Thus, even when abnormality such as breakdown of a relay has occurred, electric power can be recovered to be fed to all the loads directly relevant to any one of running, turning and stopping of the vehicle.

In the case of the power supply box body circuit 10 shown in FIG. 1, the load connected to the output terminal 13g, 13h belongs to the IG1 system of the vehicle and is not directly relevant to driving. Therefore, low priority can be allocated to the load connected to the output terminal 13g, 13h. Accordingly, the microcomputer 51 cuts off electric power feed to the output terminal 13g, 13h in S26. Practically, due to the switch of the recovery second relay 42B changed over in S25, electric power feed to the output terminal 13h, 13h has already been cut off. Accordingly, nothing needs to be done in S26 in the case of the circuit shown in FIG. 1.

Incidentally, various modifications can be considered as to the configuration of the circuit in the places of the recovery second relays 42A and 42B. For example, the connection between the terminal 42A2 of the recovery second relay 42A and the terminal 42B1 of the recovery second relay 42B may be released but the terminal 42A2 may be directly connected to the output of the switch of the IG1 system relay 36. In this case, the following change may be made. That is, the recovery second relay 42A is changed over in S25 and the recovery second relay 42B is changed over in S26.

<Recovery Control 2>

In a step S11 of FIG. 2B, the microcomputer 51 measures a voltage Vbin in the +B power supply side input line 11 through the voltage monitoring portion 52 to acquire a latest value of the voltage Vbin.

In a step S12, the microcomputer 51 compares the value of the voltage Vbin acquired in S11 with a predetermined threshold, to identify presence/absence of disconnection in the +B power supply side input line 11. The voltage Vbin becomes 0 [V] when disconnection has occurred. Therefore, when an intermediate value between the normal voltage of the voltage Vbin and 0 [V] is set as the threshold, the microcomputer 51 can identify presence/absence of abnormality of the disconnection etc. The microcomputer 51 terminates the process of FIG. 2B at the normal time. The microcomputer 51 goes to S13 when the disconnection is detected.

In the step S13, the microcomputer 51 displays visual information on the display screen 63 of the display portion 62. Due to the visual information indicating occurrence of the abnormality in power supply, the user can be informed of the abnormality. Incidentally, specific contents of display control will be described later.

In a step S14, the microcomputer 51 monitors an input from the user on the touch panel 61 to thereby identify presence/absence of an input for recovery permission. When the operation input for recovery permission is detected, the microcomputer 51 goes to a next step S15. Incidentally, it is also supposed that the microcomputer 51 performs processing to go to S15 automatically, for example, after a lapse of a predetermined time in spite of absence of the operation input for recovery permission. In addition, the microcomputer 51 may omit the steps S13 and S14 but perform processing as in the modification shown in FIG. 4B, or may omit only the step S14 but keep the display function of S13.

In the step S15, the microcomputer 51 changes over the recovery first relay 41 to ON. Thus, the switch of the recovery first relay 41 is closed so that power supply electric power can be fed from the IG power supply side input line 12 to the +B power supply side input line 11 via the switch. That is, when electric power from the +B power supply side cannot be fed due to the disconnection of the +B power supply side input line 11, electric power is fed instead from the IG power supply side input line 12 to the input of the +B power supply side circuit 20 via the recovery first relay 41, as a recovery operation.

In a step S16, the microcomputer 51 controls the switch allocated for suppressing electric power consumption, so that electric power feed to the loads low in priority among the respective power supply systems can be cut off.

In the case of the power supply box body circuit 10 shown in FIG. 1, the load connected to the output terminal 13c, 13d belongs to the body system of the vehicle and is not directly relevant driving so that low priority can be allocated to the load connected to the output terminal 13c, 13d. In addition, the load connected to the output terminal 13i is in the cabin and not directly relevant to driving so that low priority can be allocated to the load connected to the output terminal 13i. Accordingly, in S16, the microcomputer 51 makes control to turn OFF the relay 26 to thereby cut off electric power feed to the output terminal 13c, 13d, and makes control to turn OFF the relay 37 to thereby cut off electric power feed to the output terminal 13j.

As to specifications of the IG power supply side input line 12, as it is assumed that only the ignition system is a load, there is a high possibility that feedable electric power may be insufficient. Therefore, when the recovery first relay 41 has been changed over to ON in S15, electric power fed from the IG power supply side input line 12 may be insufficient in comparison with electric power required by the loads. Therefore, electric power feed to the loads low in priority is cut off in S16 so that shortage of electric power can be eliminated. In this manner, even when abnormality of disconnection has occurred, electric power can be recovered to be fed to all the loads directly relevant to any one of running, turning and stopping of the vehicle.

Incidentally, the processing sequence of the steps S15 and S16 may be reversed in some cases or may be processed substantially simultaneously in other cases. The sequence of these steps may be changed if occasions demand.

<Contents of Display Control>

Contents of two kinds of display control in the vehicle power supply box device shown in FIG. 1 are shown in FIG. 3A and FIG. 3B respectively. That is, when the microcomputer 51 of the control unit 50 shown in FIG. 1 executes the "display control" of FIG. 3A or FIG. 3B, screen display for the user interface using the operating portion 60 relevant to the recovery operation can be achieved. Incidentally, the "display control" of FIG. 3A or FIG. 3B is repeatedly executed, for example, in a fixed period.

In a step S31, the microcomputer 51 updates contents to be displayed on the display screen 63 of the display portion 62 through the display control portion 54, and displays the updated contents on the screen as visual information. In addition, for example, the routes of the +B power supply side circuit 20 side and the routes of the IG power supply side circuit 30 side are displayed in different display colors (e.g. red and blue) from each other or thicknesses of lines of the routes or kinds of the lines are changed if necessary so that the routes can be visually distinguished from each other. A specific example of display contents will be described later. Incidentally, display of the routes or a failed portion may be omitted. In this case, S31, S35, S36, S39 and S40 in FIG. 3A are omitted so that processing can be performed as shown in FIG. 3B.

The microcomputer 51 identifies presence/absence of abnormality in power supply in S32. When the abnormality is present, the microcomputer 51 goes to S33. In the step S33, for example, the microcomputer 51 displays a message using characters to notify the user of occurrence of the abnormality in power supply. In a step 34, the microcomputer 51 displays an "OK" button for operation on the screen so that an input operation can be performed by the user.

In the step S35, the microcomputer 51 adds display of a figure etc. indicating the occurrence of the abnormality at an abnormality occurrence place in the electric power feeding routes shown on the screen in S31. In the step S36, the microcomputer 51 automatically distinguishes the route where electric power feed is stopped from the routes where electric power feed is continued based on the occurrence of the abnormality, and changes over, of the electric power feeding routes displayed on the screen in S31, display of the route where the electric power feed is stopped, to a non-display state or a display suppression state.

In a step S37, the microcomputer 51 identifies whether route changeover has been completed or not by the recover control shown in FIG. 2A or FIG. 2B. When the route changeover has been completed, the microcomputer 51 goes to a next step S38.

In the step S38, the microcomputer 51 displays a message indicating "under recovery" on the screen, for example, as visual information using characters. In the step S39, the microcomputer 51 displays the route where electric power is fed by the recovery operation on the screen. In the step S40, the microcomputer 51 turns off or suppresses route display of the place where electric power feed has been cut off by the recovery operation, on the screen.

<Specific Example of Screen Display>

A specific example of display contents of the display screen 63 corresponding to the "recovery control 1" shown in FIG. 2A and the "display control" shown in FIG. 3A will be described below.

Figure 5:
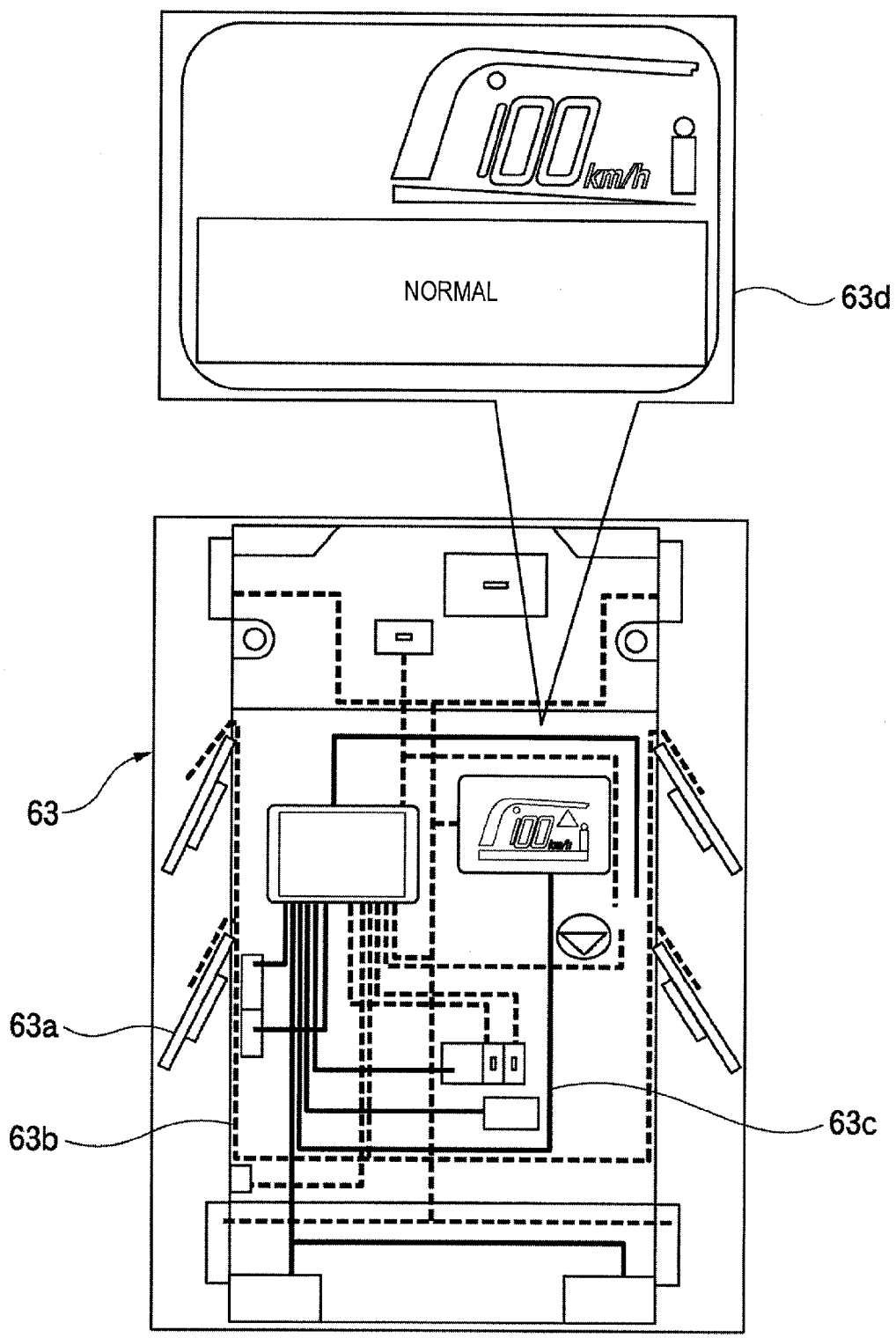
FIG. 5 is a front view showing display contents of a normal time on a display screen in the vehicle power supply box device shown in FIG. 1.
Figure 6:
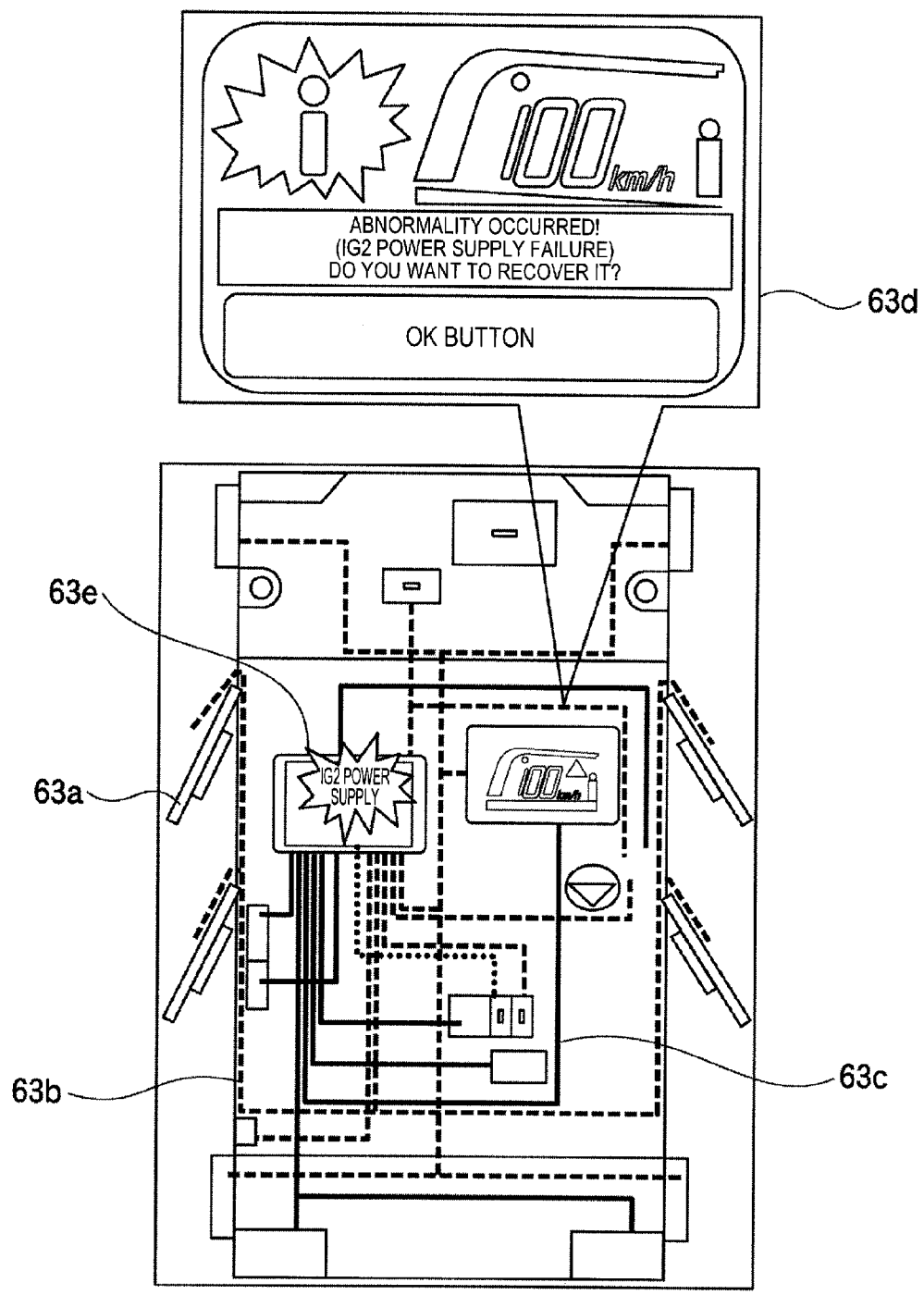
FIG. 6 is a front view showing display contents of an abnormality occurrence time on the display screen in the vehicle power supply box device shown in FIG. 1.
Figure 7:
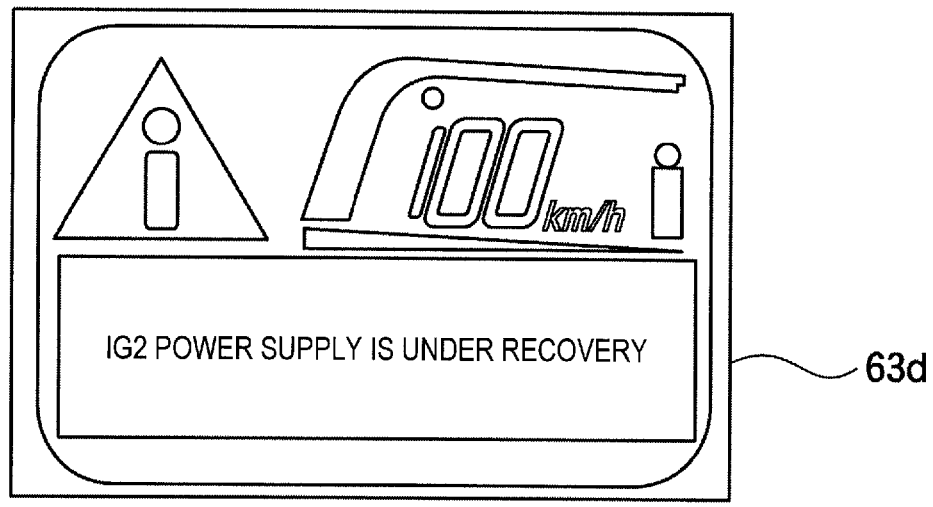
FIG. 7 is a front view showing display contents of a recovery operation time in the vehicle power supply box device shown in FIG. 1.

Display contents of the normal time on the display screen in the vehicle power supply box device shown in FIG. 1 are shown in FIG. 5. In addition, display contents of the abnormality occurrence time on the display screen are shown in FIG. 6. Display contents of the recovery operation time are shown in FIG. 7.

As shown in FIG. 5, a visual pattern of a shape imitating a contour shape of a vehicle body of the vehicle is displayed as a vehicle body indication 63a on the display screen 63 of the display portion 62.

In addition, when the step S31 in FIG. 3 has been executed, a route indication 63b and a route indication 63c indicating actual main electric power feeding routes are displayed on the screen. That is, of the electric power feeding routes of the power supply box body circuit 10 shown in FIG. 1, an actual route passage position corresponding to the +B power supply side circuit 20 is displayed as the route indication 63b, and an actual route passage position corresponding to the IG power supply side circuit 30 is displayed as the route indication 63c. In addition, for example, the route indication 63b is displayed in a red display color, and the route indication 63c is displayed in a blue display color.

In addition, a UI display portion 63d is displayed on the screen as in FIG. 5. When abnormality in power supply does not occur, characters "normal" are displayed.

On the other hand, when abnormality has been detected due to occurrence of breakdown in the IG2 system relay 28, display contents of the screen are updated as shown in FIG. 6.

In a display example of FIG. 6, a message "abnormality in power supply: IG2 power supply failure" is displayed in the UI display portion 63d (S33), and the "OK" button for operation is also displayed (S34). In addition, an abnormality display pattern 63e is displayed in an abnormality occurrence place on the route (S35). In addition, the route indication 63b indicating the route where electric power is not fed due to the occurrence of the abnormality, i.e. the +B power supply side circuit 20 on a downstream side of the output of the IG2 system relay 28 is updated in a non-display state or a display suppression state (S36).

When the recovery operation has been then executed by the control of FIG. 2A, display contents of the UI display portion 63d are updated as shown in FIG. 7. In a display example of FIG. 7, a message "IG2 power supply is under recovery" is displayed on the UI display portion 63d (S38). Incidentally, a message "abnormality occurred in IG2 power supply" may be displayed in place of the display example of FIG. 7.

Although not shown, as to the route indication 63b corresponding to the electric power feeding route inside the +B power supply side circuit 20 where electric power is fed due to the recovery, the route of the place where electric power is actually fed is displayed in the same display color as the route indication 63c by S39. In addition, although not shown, as to the place where electric power feed has been cut off due to the recovery, the route indication is changed over to OFF by S40.

Incidentally, the form in which the routes or the failed portion is displayed has been described here with reference to FIGS. 5 to 7. The indications or indication for the routes or the failed portion is not essential but may be omitted in the embodiment of the invention. According to a form in this case, processing may be performed as shown in FIG. 3B from which S31, S35, S36, S39 and S40 in FIG. 3A have been omitted so that information can be displayed by only the UI display portion 63d.

<Description of Advantages>

The "recovery control 1" shown in FIG. 2A is carried out. Thus, the route can be changed over by the recovery second relays 42A and 42B (S25) when electric power cannot be fed to the output side of the switch of the IG2 system relay 28 due to occurrence of breakdown of the IG2 system relay 28. Accordingly, electric power can be fed from the output of the IG1 system relay 36 to the input side of the IG2 system circuit (fuse 24, 25). Thus, even when power supply failure has occurred due to unexpected abnormality (breakdown) in power supply, it is possible to secure a route for feeding electric power to various electric devices required for driving of the vehicle, so that it is possible to improve safety of the vehicle.

In addition, when the recovery second relays 42A and 42B are controlled to perform the recovery operation in S25, electric power feed to the loads low in priority and not directly relevant to driving of the vehicle is cut off (S26). Thus, it is possible to suppress total electric power consumption of the loads to thereby prevent shortage of fed electric power in advance.

The "recovery control 2" shown in FIG. 2B is carried out. Thus, electric power can be fed instead from the IG power supply side input line 12 to the input of the +B power supply side circuit 20 using the switch of the recovery first relay 41 when electric power cannot be fed to the input of the +B power supply side circuit 20 due to occurrence of disconnection of the +B power supply side input line 11. Thus, even when power supply failure has occurred due to unexpected abnormality (disconnection) in power supply, it is possible to secure a route for feeding electric power to various electric devices which are necessary for driving of the vehicle, so that it is possible to improve safety of the vehicle.

In addition, even when the recovery first relay 41 is controlled to perform the recovery operation in S15, electric power feed to the loads low in priority and not directly relevant to driving of the vehicle is cut off (S16). Thus, it is possible to suppress total electric power consumption of the loads to thereby prevent shortage of fed electric power in advance.

Modification

Figure 9:
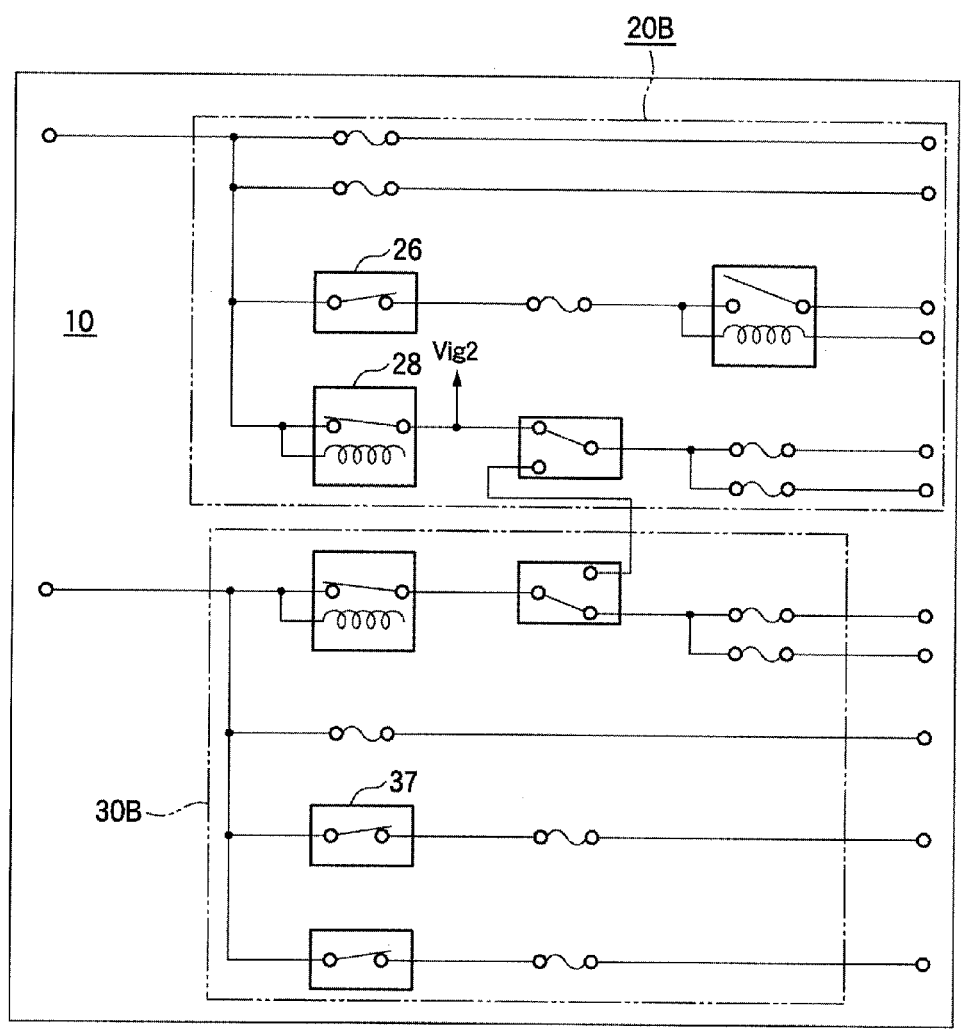
FIG. 9 is an electric circuit diagram showing a modification of the configuration of the power supply box body circuit.

A modification of the configuration of the aforementioned power supply box body circuit 10 is shown in FIG. 9. Mounting of the recovery first relay 41 shown in FIG. 1 has been omitted from the power supply box body circuit 10 shown in FIG. 9. Incidentally, the relay 26 and the relay 37 may be further omitted.

That is, when the "recovery control 1" shown in FIG. 2A is carried out and execution of the "recovery control 2" shown in FIG. 2B is omitted, the recovery first relay 41 is not used. Accordingly, the recovery first relay 41 can be dispensed with. Even when only the "recovery control 1" is carried out, it is possible to secure the electric power feeding route during breakdown of the IG2 system relay 28.

Here, the vehicle power supply box device according to the embodiment of the invention is summarized briefly and listed in the following items [1] to [5] respectively.

[1] A vehicle power supply box device (power supply box body circuit 10) which is connected between: a first input side power supply line (power supply side input line 11) for constantly feeding power supply electric power from a main power supply on a vehicle and a second input side power supply line (power supply side input line 12) for feeding power supply electric power from the main power supply in association with a state of an ignition switch of the vehicle; and a plurality of electric parts mounted on the vehicle, the vehicle power supply box device including:

a first ignition electric power control system (IG1 system) which includes a first ignition relay (IG1 system relay 36) connected downstream of the second input side power supply line to be turned ON/OFF in association with the state of the ignition switch, and which feeds power supply electric power to first group electric parts (not shown) from an output of a switch portion of the first ignition relay;

a second ignition electric power control system (IG2 system) which includes a second ignition relay (IG2 system relay 28) connected downstream of the first input side power supply line to be turned ON/OFF in association with the state of the ignition switch, and which feeds power supply electric power to second group electric parts (not shown) from an output of a switch portion of the second ignition relay;

a recovery switch portion (recovery second relays 42A and 42B) which is connected between the output of the switch portion of the first ignition relay and an output of the second ignition electric power control system;

an operation abnormality detecting portion (microcomputer 51, voltage monitoring portion 52) which detects presence/absence of abnormality in the output of the switch portion of the second ignition relay (IG2 system relay 28); and a recovery control portion (microcomputer 51, S25) which controls the recovery switch portion to be turned ON/OFF in accordance with the presence/absence of the abnormality detected by the operation abnormality detecting portion.

[2] The vehicle power supply box device according to the item [1], wherein the recovery switch portion includes:

a first selection switch portion (recovery second relay 42A) which selects one of the output of the switch portion of the first ignition relay and the output of the switch portion of the second ignition relay as an electric power feeding system connected to an input of the second group electric parts; and a second selection switch portion (recovery second relay 42B) which cuts off electric power feed to the first group electric parts in response to selection of the output of the switch portion of the first ignition relay by the first selection switch portion.

[3] The vehicle power supply box device according to the item [1] or [2], wherein the operation abnormality detecting portion monitors an input voltage to detect presence/absence of abnormality corresponding to operation failure in the second ignition relay (IG2 system relay 28) (S21, S22).

[4] The vehicle power supply box device according to any one of the items [1] to [3], further including:

an operating portion (touch panel 61) which accepts an input operation from a user; and a display portion (62) which displays desired information as visual information, wherein the recovery control portion (51) displays visual information indicating occurrence of abnormality on the display portion (S23) in response to detection of the abnormality by the operation abnormality detecting portion, and changes over the recovery switch portion to ON (S25) in response to detection of an instruction issued from the user to indicate permission of a recovery operation by the operating portion.

[5] The vehicle power supply box device according to any one of the items [1] to [3], further including:

a display portion which displays desired information as visual information, wherein the recovery control portion displays, on the display portion, at least one of visual information indicating occurrence of abnormality and visual information indicating that a predetermined recovery operation is in execution due to the occurrence of the abnormality (S33, S35, S38).

Although the invention has been described in detail and with reference to a specific embodiment, it is obvious to those skilled in the art that various changes or modifications can be added without departing from the spirit and scope of the invention.

According to embodiments of the invention, it is possible to obtain an effect that a route for feeding electric power to at least an electric device high in importance can be secured even when unexpected abnormality in power supply has occurred. The embodiments of the invention which can obtain the effect are useful for a vehicle power supply box device.

The invention claimed is:

1. A vehicle power supply box device which is connected between: a first input side power supply line for constantly feeding power supply electric power from a main power supply on a vehicle and a second input side power supply line for feeding power supply electric power from the main power supply in association with a state of an ignition switch of the vehicle; and a plurality of electric parts mounted on the vehicle, the vehicle power supply box device comprising:

a first ignition electric power control system which comprises a first ignition relay connected downstream of the second input side power supply line to be turned ON/OFF in association with the state of the ignition switch, and which feeds power supply electric power to first group electric parts from an output of a switch portion of the first ignition relay;

a second ignition electric power control system which comprises a second ignition relay connected downstream of the first input side power supply line to be turned ON/OFF in association with the state of the ignition switch, and which feeds power supply electric power to second group electric parts from an output of a switch portion of the second ignition relay;

a recovery switch portion which is connected between the output of the switch portion of the first ignition relay and an output of the second ignition electric power control system;

an operation abnormality detecting portion which detects presence/absence of abnormality in the output of the switch portion of the second ignition relay; and a recovery control portion which controls the recovery switch portion to be turned ON/OFF in accordance with the presence/absence of the abnormality detected by the operation abnormality detecting portion.

2. The vehicle power supply box device according to claim 1, wherein the recovery switch portion comprises:

a first selection switch portion which selects one of the output of the switch portion of the first ignition relay and the output of the switch portion of the second ignition relay as an electric power feeding system connected to an input of the second group electric parts; and a second selection switch portion which cuts off electric power feed to the first group electric parts in response to selection of the output of the switch portion of the first ignition relay by the first selection switch portion.

3. The vehicle power supply box device according to claim 1, wherein the operation abnormality detecting portion monitors an input voltage to detect presence/absence of abnormality corresponding to operation failure in the second ignition relay.

4. The vehicle power supply box device according to claim 1, further comprising:

an operating portion which accepts an input operation from a user; and a display portion which displays desired information as visual information, wherein the recovery control portion displays visual information indicating occurrence of abnormality on the display portion in response to detection of the abnormality by the operation abnormality detecting portion, and changes over the recovery switch portion to ON in response to detection of an instruction issued from the user to indicate permission of a recovery operation by the operating portion.

5. The vehicle power supply box device according to claim 1, further comprising:

a display portion which displays desired information as visual information, wherein the recovery control portion displays, on the display portion, at least one of visual information indicating occurrence of abnormality and visual information indicating that a predetermined recovery operation is in execution due to the occurrence of the abnormality.

* * * * *

UNITED STATES PATENT AND TRADEMARK OFFICE
CERTIFICATE OF CORRECTION

| | |
|---|---|
| PATENT NO. | : 10,155,490 B2 |
| APPLICATION NO. | : 15/444710 |
| DATED | : December 18, 2018 |
| INVENTOR(S) | : Kousuke Kinoshita, Masahiro Takamatsu and Koichi Uezono |

Page 1 of 1

It is certified that error appears in the above-identified patent and that said Letters Patent is hereby corrected as shown below:

On the Title Page

Column 1, (30) Foreign Application Priority Data; "2014-199131" has been replaced with
-- 2014-199130 --

Signed and Sealed this
Twelfth Day of March, 2019

Andrei Iancu
*Director of the United States Patent and Trademark Office*